United States Patent [19]
Class et al.

[11] Patent Number: 6,023,677
[45] Date of Patent: Feb. 8, 2000

[54] SPEECH RECOGNITION METHOD

[75] Inventors: Fritz Class, Roemerstein; Alfred Kaltenmeier, Ulm; Ute Kilian, Roemerstein; Peter Regel-Brietzmann, Ulm, all of Germany

[73] Assignee: Daimler Benz AG, Stuttgart, Germany

[21] Appl. No.: 08/875,262

[22] PCT Filed: Nov. 23, 1995

[86] PCT No.: PCT/EP95/04626

§ 371 Date: Sep. 24, 1997

§ 102(e) Date: Sep. 24, 1997

[87] PCT Pub. No.: WO96/22593

PCT Pub. Date: Jul. 25, 1996

[30] Foreign Application Priority Data

Jan. 20, 1995 [DE] Germany .................. 195 01 599

[51] Int. Cl.$^7$ .................. G10L 5/06; G10L 9/00
[52] U.S. Cl. .................. 704/254; 704/251; 704/255
[58] Field of Search .................. 704/254, 255, 704/243, 251

[56] References Cited

U.S. PATENT DOCUMENTS

| | | | |
|---|---|---|---|
| 4,277,644 | 7/1981 | Levinson et al. . | |
| 4,882,757 | 11/1989 | Fisher | 704/254 |
| 5,467,425 | 11/1995 | Lau | 704/243 |
| 5,787,230 | 7/1998 | Lee | 704/255 |

FOREIGN PATENT DOCUMENTS 0435580  7/1991  European Pat. Off. .

OTHER PUBLICATIONS

Rabiner, L R, Juang, B–H, Fundamentals of Speech Recognition, AT&T/Prentice Hall, pp. 442–3, 448, 450–1, Jan. 1993.

Bruce Lowerre et al, "The Harpy Speech Understanding System", Trends in Speech Recognition, Speech Communications Research Laboratory and University of Southern California (1980), pp. 340–360.

Hermann Ney et al, "On structuring probabilistic dependencies in stochastic language modelling", 8300 Computer Speech & Language, vol. 8, No. 1, (Jan., 1994), pp. 1–38.

Hermann Ney, "Automatische Spracherkennung: Architektur und Suchstrategie aus statistischer Sicht", Informatics Research Development, vol. 7 (1992), pp. 83–97.

Sei–ichi Nakagawa, "Speaker–independent continuous–speech recognition by phoneme–based word spotting and time–synchronous context–free parsing", 8300 Computer Speech & Language, vol. 3, No. 3 (Jul., 1989), pp. 277–299.

*Primary Examiner*—David R. Hudspeth
*Assistant Examiner*—Robert Louis Sax
*Attorney, Agent, or Firm*—Venable; George H. Spencer; Allen Wood

[57] ABSTRACT

In a speech recognition method for word sequences that are combined in sentences with defined syntax, syntax information is integrated into a speech model so as to unambiguously identify recurring words through indexing. As a result, the recognition process can be carried out in a manner similar to the situation without integration of the syntax information.

13 Claims, 3 Drawing Sheets

| WORD | PERMISSIBLE SUCCESSORS |
|---|---|
| START | w1_1, w2_1 |
| w1_1 | w3_1, w4_1 |
| w1_2 | END |
| w2_1 | w3_2, w5_1 |
| w3_1 | w6_1 |
| w3_2 | w1_2 |
| w4_1 | w6_1 |
| w5_1 | W1_2 |
| w6_1 | END |

| WORD | PERMISSIBLE SUCCESSORS |
|------|------------------------|
| START | w1, w2 |
| w1 | w3, w4, END |
| w2 | w3, w5 |
| w3 | w1, w6 |
| w4 | w6 |
| w5 | w1 |
| w6 | END |

| WORD | PERMISSIBLE SUCCESSORS |
|---|---|
| START | w1_1, w2_1 |
| w1_1 | w3_1, w4_1 |
| w1_2 | END |
| w2_1 | w3_2, w5_1 |
| w3_1 | w6_1 |
| w3_2 | w1_2 |
| w4_1 | w6_1 |
| w5_1 | W1_2 |
| w6_1 | END |

SPEECH RECOGNITION METHOD

BACKGROUND OF THE INVENTION

The invention relates to a speech recognition method and more particularly to a method of the type in which sentences that have been put together from words of a given vocabulary are recognized, wherein a limited number of permissible sentences and an N-gram speech model into which the syntax of the permissible sentences is integrated are predetermined.

In the recognition of connected speech, which permits any combination of all words, the error rate increases considerably compared to the recognition of individual words. To counteract this, knowledge on permissible word sequences, for example, can be stored in so-called speech models and can be used in the recognition. As a result, the number of permissible sentences can be limited considerably.

Usually, speech models are defined as N-gram models, with N being identified as the depth of the model and indicating the number of words following one another within a word sequence which are considered in the actual evaluation of a word sequence hypothesis. The recognition process becomes rapidly more complex as N increases; therefore, the particularly simple bigram model with N=2 is preferred which only considers combinations of two words. The speech models can be further simplified if words, which occur in the same context but which do not necessarily have to have the same meaning, are combined in word groups (e. g., all weekdays). Instead of individual word transitions, the speech models can consider the transition from one word group to another.

In Informatik Forsch. Entw. [Informatics Research Development] (1992) 7, p. 83–97, basic problems of the automatic recognition of flowing language are dealt with in detail and approaches for solving problems are described from the point of view of statistical decision theory. The focus is on the stochastic modelling of knowledge sources for acoustics and linguistics, e. g., in the form of phoneme models, pronunciation dictionary and speech model.

From "The HARPY Speech Understanding System" in Readings in Speech Recognition, 1990, Morgan Kaufmann Publishers Inc., a speech recognition system is known which has a greatly limited number of permissible sentences. The syntactic and semantic constraints determining permissibility can be formulated in grammar equations and can be represented as a graph. A few simplifications are introduced in order to get from the grammar definition, which is complete but involves great processing complexity, to a compact speech model with reasonable processing complexity.

But sometimes such simplifications are only possible if it is accepted for the speech model that nonpermissible word sequences in the original grammar definition appear as being permissible again. Finally, in the HARPY system, the words are replaced by their phonetic definitions and, in this manner, a phonetic model for a complete sentence recognizer is created.

SUMMARY OF THE INVENTION

It is the object of the present invention to propose a method for speech recognition which has a high recognition rate while the processing complexity is low.

According to the invention, a speech recognition method of the type mentioned at the outset is characterized in that for words which recur in the number of permissible sentences in different syntactical positions, recurrent specimens that can be distinguished from one another are predetermined in the speech model with the syntactical constraints that are valid for the respective position, and in that, through continuous consideration of the syntactical constraints of the speech model during the recognition process in progress, only the matching of an actual speech signal with permissible word sequences is examiner.

By way of the distinguishable identification of words which are recurring in the grammar of the number of permissible sentences, the invention permits the implicit and complete detection in the speech model of the permissible predecessors of a specific word in a defined sentence position without having to first explicitly store all permissible previous transitions to this word. This corresponds to an N-gram speech model having a variable N which is a function of the respective word position. The distinguishable identification of recurring identical words is identified in the following as indexing of the words.

Preferably, the syntax information can be integrated in a bigram speech model. The recognition process, which preferably is an HMM (Hidden Markov Model) recognition process, can proceed in the same manner as without the integration of the syntax into the speech model.

It is not necessary to considerably expand a customary pronunciation dictionary used for the acoustic word recognition, because one and the same dictionary entry can be allocated to all specimens of the same word which are indexed differently in the speech model. The bigram syntax information can then be considered in an advantageous manner in that several word end nodes are assigned to the dictionary entry comprised of a sequence of word subunits according to the multiple occurrence in the speech model.

In the speech recognition of the method according to the invention, speech signal inputs are always assigned to syntactically correct sentences. Therefore, the option is preferably provided that an input is rejected by the recognition system. Advantageous for this purpose is the assignment of a probability value to recognized sentences and the comparison of the probability values with a predeterminable rejection threshold. The global sentence probability, normalized for the length of a sentence, forms a well suited measure for the assignment of the probability values. Particularly the probabilities for the acoustic recognition of the individual words are integrated into the global sentence probability. In addition, it is also possible to consider probabilities from statistical distributions of word sequences in the speech model or frequencies of sentences in training amounts.

Preferably, the probability evaluation is also carried out while the recognition process is in progress and it is used as a basis for blocking paths whose probability is too low.

BRIEF DESCRIPTION OF THE INVENTION

FIG. 2b is a table illustrating bigram information regarding permissible successors for each word in the network graph of FIG. 1a;

FIG. 2a shows an example of a network graph for a speech model in accordance with the present invention;

FIG. 2b is a table illustrating indexed bigram information regarding permissible successors for each word in the network graph of FIG. 2a.

DESCRIPTION OF THE PREFERRED EMBODIMENTS

Figures 1A, 1B:
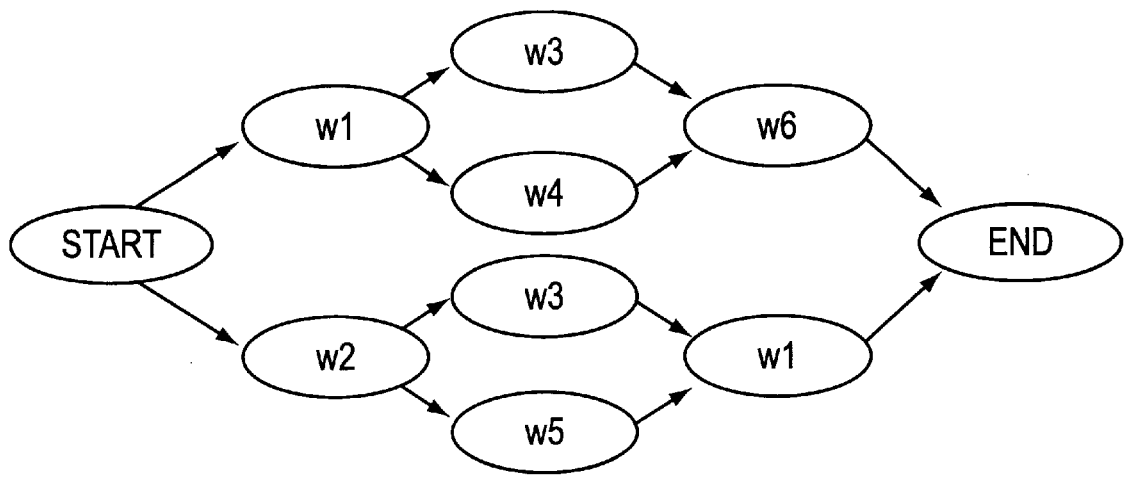
FIG. 1a shows an example of a network graph for a speech model in accordance with the prior art.

FIG. 1a shows a simple conventional example of a network graph for a speech model, which, from the words w1 to w6 between the beginning of the sentence Start and the end of the sentence End, permits the word sequences w1w3w6, w1w4w6, w2w3w1, w2w5w1 as sentences. The bigram information regarding the permissible successors for each word w1 to w6, which information can be derived from the graph, is indicated as a table in FIG. 1b. But in a speech model that is based on this bigram information, non-permissible sentences such as, for example, w1w3w1w4w6, appear as being permissible.

Figures 2A, 2B:
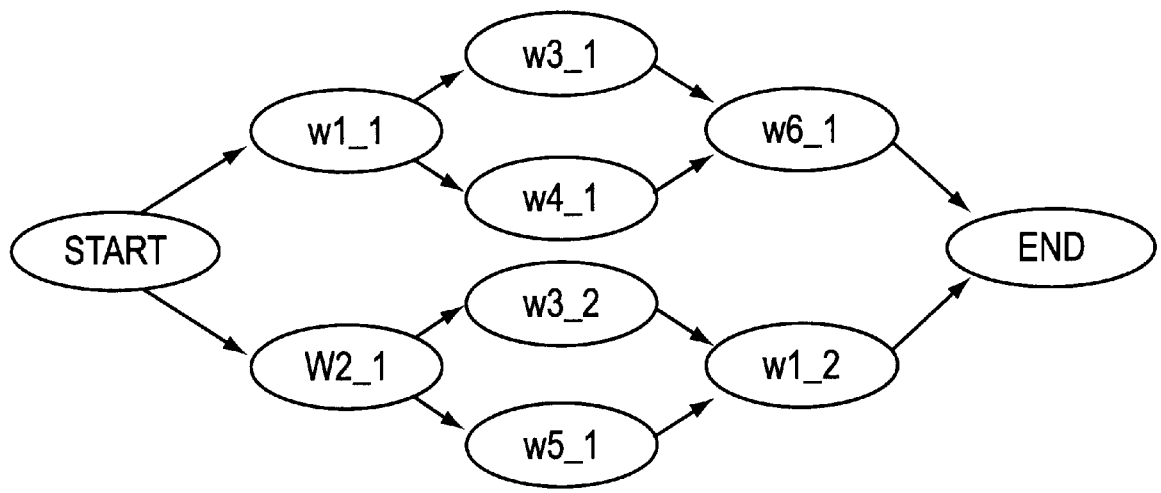

In contrast, the essential change according to the invention can be seen from FIG. 2a and FIG. 2b. The number of the permissible sentences determined by the network graph according to FIG. 1a comprises the words w1 and w3 respectively in two syntactically different positions. In FIG. 2a, these recurring words are now identified by indexing as specimens that can be distinguished from one another, with the index _m with m as an integral serial number being assignable to the recurrent specimens of a word within the graph in a sequence which is arbitrary per se. It is important that, by way of the indexing, words in syntactic positions which cannot be exchanged without changing the admissibility of all sentences, be marked in an unambiguous manner. To unify the notation, all words which occur only once are also provided with an index _1. Compared to the table in FIG. 1b, the bigram information table in FIG. 2b regarding the graph of FIG. 2a is expanded by the recurrent specimens, but it now conveys a rule concerning all permissible sentences which is exactly identical to the graph and it has a lesser mean degree of branching.

Since the phonetic representations are identical for all recurrent specimens of the same word, the pronunciation dictionary containing these phonetic representations does not have to be expanded to the same extent. For all recurrent specimens of the same word, the same dictionary entry can be used; only at the end of the word is it necessary to again permit an unambiguous assignment to the respectively permissible successors. With regard to a dictionary entry concerned, several word end nodes can advantageously be provided for this purpose which take the different syntax constraints of the word positions into account which can be distinguished through indexing.

In the advantageous combination of words into word groups, word groups which are indexed in a distinguishable manner respectively take the place of the words w1_1 to w6_1 in the network graph and in the bigram tables. Analogously, the members of a word group must be unambiguously identified by means of indexing.

Figure 3:
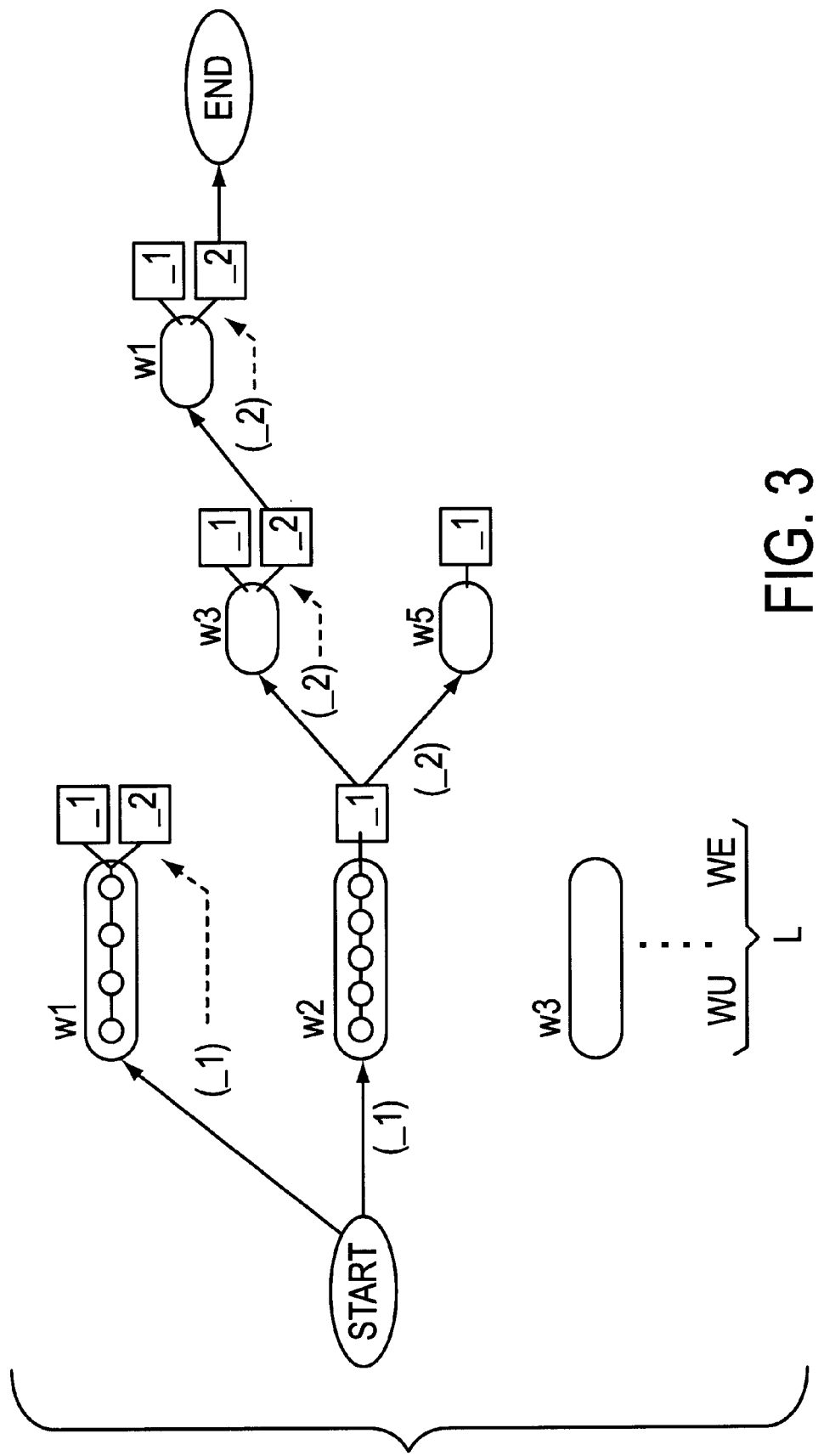
FIG. 3 schematically illustrates a recognition process for a word sequence that is permissible as a sentence in the example according to FIGS. 2a and 2b.

FIG. 3 illustrates the sequence of the recognition process for a word sequence w2w3w1 permissible as a sentence in the example according to FIGS. 2a, 2b. Starting from a beginning sentence node Start, only w1 or w2 are permissible as a first word. The beginning of a speech signal is thus checked for possible matching with w1 and/or w2. For this purpose, the linguistic characteristics of these two words that are deposited in a pronunciation dictionary L are used. Usually, the dictionary entries comprise a plurality of word subunits for each word with rules regarding their permissible sequence. The procedure for the recognition of a word can take place, for example, like in the mentioned Harpy system by running through a tree-like search path structure with continuous evaluation of the individual examined paths and with blocking of paths receiving a low rating.

In FIG. 3, a linear chain of several word subunits WU (circles) is plotted in a simplified manner for the search structure.

As has already been mentioned, the dictionary entries also comprise word end nodes WE (squares in FIG. 3), with a dictionary entry having several word end nodes for identical words recurring in different positions in the graph of FIG. 2a corresponding to their indexing; the word end nodes can respectively be allocated to one of the indexed specimens of the same word by the matching index and can determine the permissible successor words. When accessing the dictionary, the index of a word is considered in such a manner that by means of the index the correct selection is made from the possibly several word end nodes.

In the example sketched in FIG. 3 it is assumed that the speech signal does not show a sufficient phonetic matching with the dictionary entry for the word w1 and that this portion of the search path is broken off even before the word end of w1 is reached. On the other hand, it is assumed that the speech signal shows a good matching with the dictionary entry for the word w2 so that this search path is pursued further. Since, in the speech model, w2 only appears in one position, there is only one word end node from which the search branches out to the examination of the words w3 and w5 as permissible successors which are made to be unambiguous through indexing according to the invention as w3_2 and w5_1. For w5, it is again assumed that there is a lack of phonetic matching with the continuous speech signal and a break-off of this portion of the search path, whereas the search path via w3 is pursued further up to the branching into the two word end nodes with indices _1 and _2. By means of the index _2 from the indexed access to the dictionary entry w3, the identically indexed word end node for the continuation of the search path is selected from which w1_2 results as the only permissible successor word. Its dictionary entry is again compared with the continuous speech signal. If there is sufficient matching, the search path is pursued further to the end of the sentence via the word end node indexed with _2.

In an actual case, several search paths are preferably pursued completely to the end of the sentence and they are then subjected to a further selection in which, for example, one of the recognized sentences is selected as being the best sentence through threshold value setting and/or comparison of the global sentence probabilities or other evaluation quantities that are known per se, and the sentence is processed further, e. g., as a command to be executed.

We claim:

1. A method for the speech recognition of sentences that are put together from several words of a given vocabulary, wherein a limited number of permissible sentences are predetermined, the permissible sentences having a syntax and the words of the given vocabulary having syntactical positions in the permissible sentences, said method comprising the steps of:

(a) providing an N-gram speech model into which the syntax of the permissible sentences is integrated, the speech model being such that words which recur in the permissible sentences in different syntactical positions are distinguished from one another in the speech model, according to syntactical constraints, by indexes that are valid for the syntactical positions of the words which recur;

(b) conducting a recognition process; and (c) while the recognition process of step (b) is in progress, examining only a matching of an actual speech signal with permissible N-gram word sequences that are determined through consideration of the syntactical constraints by consideration of the indexes of the speech model.

2. A method according to claim 1, wherein step (b) is conducted using an HMM recognition process.

3. A method according to claim 1, wherein step (a) comprises providing a bigram model as the speech model.

4. A method according to claim 1, wherein step (b) is conducted using a pronunciation dictionary having entries, the same entry in the pronunciation dictionary being assigned to a predetermined recurring word in the speech model, which entry is associated unambiguously with its different syntactical positions by word end nodes.

5. A method according to claim 1, wherein probability values are assigned to the permissible word sequences, and wherein step (b) comprises subjecting these probability values to a threshold value comparison during the recognition process.

6. A method according to claim 5, further comprising the step of determining a global word sequence probability, normalized for the actual length of a word sequence, for use as a probability value.

7. A method according to claim 1, wherein the permissible word sequences are determined in step (c) through continuous consideration of the syntactical constraints.

8. A method for recognizing a spoken sentence composed of words selected from a predetermined vocabulary from which a plurality of permissible sentences can be formed, comprising:

(a) selecting a subset of the predetermined vocabulary;

(b) recognizing a word in the subset selected in step (a) as the first word of the spoken sentence;

(c) selecting another subset of the predetermined vocabulary, based at least in part on the previously recognized word;

(d) recognizing a word in the subset selected in step (c) as the next word of the spoken sentence; and (e) repeating steps (c) and (d) until the last word of the spoken sentence is recognized, wherein a given word in the predetermined vocabulary appears in a first syntactical position in at least one of the permissible sentences and also appears in a second syntactical position in at least one of the permissible sentences, and wherein step (c) is conducted so that if the given word appears in its first syntactical position in the spoken sentence, the subset selected following recognition of the given word is a first subset, and if the given word appears in its second syntactical position in the spoken sentence, the subset selected following recognition of the given word is a second subset that differs from the first subset.

9. The method of claim 8, wherein:

the given vocabulary also includes an additional word and a further word; and step (c) is also conducted so that if the additional word appears in the spoken sentence, the subset selected following recognition of the additional word includes the given word indexed for its first syntactical position, and if the further word appears in the spoken sentence, the subset selected following recognition of the further word includes the given word indexed for its second syntactical position.

10. The method of claim 8, wherein the subsets are selected in steps (a) and (c) using an N-gram speech model.

11. The method of claim 10, wherein N is two.

12. The method of claim 8, wherein steps (b) and (d) are conducted using an HMM recognition process.

13. The method of claim 8, wherein steps (b) and (d) are conducted using a pronunciation dictionary having entries, an entry in the pronunciation dictionary being assigned to the given word, which entry is associated with the first and second syntactical positions of the given word by word end nodes.

* * * * *